United States Patent
Kondo et al.

(10) Patent No.: US 6,654,329 B1
(45) Date of Patent: Nov. 25, 2003

(54) DISC DRIVE UNIT

(75) Inventors: Masamichi Kondo, Tokyo (JP); Tatsuo Mikami, Kanagawa (JP); Norio Nishida, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/559,615

(22) Filed: Apr. 27, 2000

(30) Foreign Application Priority Data

Apr. 28, 1999 (JP) .......................................... P11-122874

(51) Int. Cl.[7] .................................................. G11B 7/00
(52) U.S. Cl. ................................ 369/53.27; 369/53.31; 369/116
(58) Field of Search ...................... 369/44.11, 44.25, 369/44.32, 53.12, 53.13, 53.14, 53.15, 53.17, 53.31, 53.26, 53.27, 116, 44.31, 47.5, 47.57

(56) References Cited

U.S. PATENT DOCUMENTS

| | | | |
|---|---|---|---|
| 4,879,703 A | * 11/1989 | Kaku et al. | 369/53.17 |
| 5,184,343 A | 2/1993 | Johann et al. | |
| 5,218,491 A | 6/1993 | Nishida et al. | 360/73.03 |
| 5,528,570 A | 6/1996 | Kondo | 369/48 |
| 5,561,644 A | 10/1996 | Kondo | 369/32 |
| 5,568,461 A | * 10/1996 | Nishiuchi et al. | 369/44.26 |
| 5,586,098 A | 12/1996 | Nishida et al. | 369/116 |
| 5,650,983 A | 7/1997 | Kondo et al. | 367/13 |
| 5,726,961 A | * 3/1998 | Yanagawa | 369/44.31 |
| 5,739,521 A | 4/1998 | Lee | |
| 5,818,804 A | 10/1998 | Obata et al. | |
| 5,878,014 A | 3/1999 | Hoeven | |
| 6,075,762 A | 6/2000 | Watanabe | |
| 6,188,657 B1 | * 2/2001 | Kim et al. | 369/53.11 |
| 6,317,395 B1 | * 11/2001 | Yamamoto et al. | 369/44.35 |
| 6,442,116 B2 | * 8/2002 | Asano | 369/47.28 |

* cited by examiner

Primary Examiner—Thang V. Tran
Assistant Examiner—Bach Vuong
(74) Attorney, Agent, or Firm—Oblon, Spivak, McClelland, Maier & Neustadt, P.C.

(57) ABSTRACT

There is provided a disk drive unit which is capable of making control corresponding to contaminant and defect by discriminating the contaminant (dust, scratch) on the disk surface from the defect on the recording plane. In a pull-in signal PI corresponding to reflected light from a disk, a defect detecting signal corresponding to a signal whose level change is relatively quick corresponding to the defect of the recording plane and a contaminant detecting signal which corresponds to a signal whose level change is relatively slow corresponding to the contaminant on the disk surface are generated. When the defect detecting signal is at low level for example, a system controller retries a recording operation or increases laser light when the contaminant detecting signal is at low level. A quantity of output light of a laser diode is controlled so that a product of output light of a laser diode and reflected light from the disk amounts to a predetermined level.

6 Claims, 6 Drawing Sheets

FIG. 5A PULL-IN SIGNAL

FIG. 5B DIFFERENTIAL SIGNAL

FIG. 5C BINARY SIGNAL

FIG. 5D BINARY SIGNAL

FIG. 5E DEFECT DETECTING SIGNAL

FIG. 5F INVERSION SIGNAL

FIG. 5G CONTAMINANT DETECTING SIGNAL

DISC DRIVE UNIT

BACKGROUND OF THE INVENTION

1. Field of the Invention

The present invention relates to a disk drive unit.

2. Description of Prior Art

Hitherto, there have been various equipment for recording/reproducing data by irradiating laser light to a recording medium such as a disk.

For instance, as such optical disk recording media, there have been developed a CD (compact disk) type disk and a disk called DVD (Digital versatile Disk/Digital Video Disk) suitably used for multi-media. A recording apparatus accommodating to those optical disks irradiates laser light modulated by recording data to tracks on the disk to record the data by a phase-change recording method for example.

Because the DVD itself is handled in a naked manner for example, however, there is a possibility that the surface of the disk collects dust or is scratched as the user uses the disk. Such dust and scratch (those on the surface of the disk such as dust and scratch will be called as contaminant as a whole hereinafter) become a factor of blocking the laser light. When the laser light is blocked by the contaminant on the surface of the disk as described above, a quantity of light arriving to the recording plane drops, thus causing a case when data cannot be recorded correctly.

Further, a quantity of light reflected from the disk changes due to the contaminant or defect caused on the recording plane during the disk manufacturing process. Accordingly, it becomes difficult to execute focus servo control and tracking servo control stably because it is unable to obtain normal focus error signals, tracking error signals and the like.

Then, the normal recording condition has been obtained by detecting such defect for example based on the changes of the quantity of light reflected from the disk and by holding the servo signal or by stopping the recording operation once to retry for example based on the result of detection.

However, the recording operation of a disk drive unit has been carried out by storing storage data supplied from an external equipment such as a host computer once in a buffer memory provided within the disk drive unit for example and by reading the recording data stored in the buffer memory. That is, when a number of times of retry increases, the frequency of reading recording data from the buffer memory drops. Accordingly, particularly when image data (video data) supplied continuously in correspondence to real time is to be recorded, an amount of data to be read out drops with respect to an amount of data read in, the storage area of the buffer memory saturates and some data may be lost. That is, there has been a problem that the number of times of retry increases and it may become difficult to carry out the recording operation stably as contaminant increases on the surface of the disk.

SUMMARY OF THE INVENTION

In order to solve such problems, according to the invention, a disk drive unit comprises head means for irradiating laser light to a loaded disk recording medium via an objective lens so as to at least recording data; objective lens driving mechanism for moving the objective lens in the direction of contacting/separating to/from the disk recording medium and in the radial direction of the disk recording medium based on certain control signals; reflected light quantity detecting means for detecting a quantity of reflected light of beam irradiated to the disk recording medium; light quantity reduction speed discriminating means for discriminating whether the reduction speed of the quantity of light detected by the reflected light quantity detecting means is faster than a certain time constant or not; and laser light output control means for controlling an output level of the laser light based on the discrimination result of the light quantity reduction speed discriminating means.

A disk drive unit also comprises head means for irradiating laser light to a loaded disk recording medium via an objective lens so as to at least recording data; output light quantity detecting means for detecting a quantity of output light of laser light outputted from the objective lens; reflected light quantity detecting means for detecting a quantity of reflected light of beam irradiated to the disk recording medium; and output light quantity control means for controlling an output level of the quantity of output light so that a product of the quantity of output light and the quantity of reflected light becomes a predetermined value.

The invention allows the cause of changes of a quantity of reflected light to be discriminated based on speed of the changes of quantity of reflected light from the disk recording medium. It then allows a required control corresponding to the change of quantity of reflected light to be made.

It is also possible to maintain a quantity of laser light arriving at the recording plane of the disk recording medium by keeping the product of the laser light and the reflected light from the disk recording medium constant.

The specific nature of the invention, as well as other objects, uses and advantages thereof, will clearly appear from the following description and from the accompanying drawings.

DESCRIPTION OF PREFERRED EMBODIMENTS

Embodiments of the inventive disk drive unit will be explained below. An optical disk loaded into the disk drive unit of this example may be a CD type disk such as CD-R and a disk called DVD (Digital Versatile Disc/Digital video Disc). The present invention is also applicable to a disk drive unit accommodating other types of optical disks.

Figure 1:
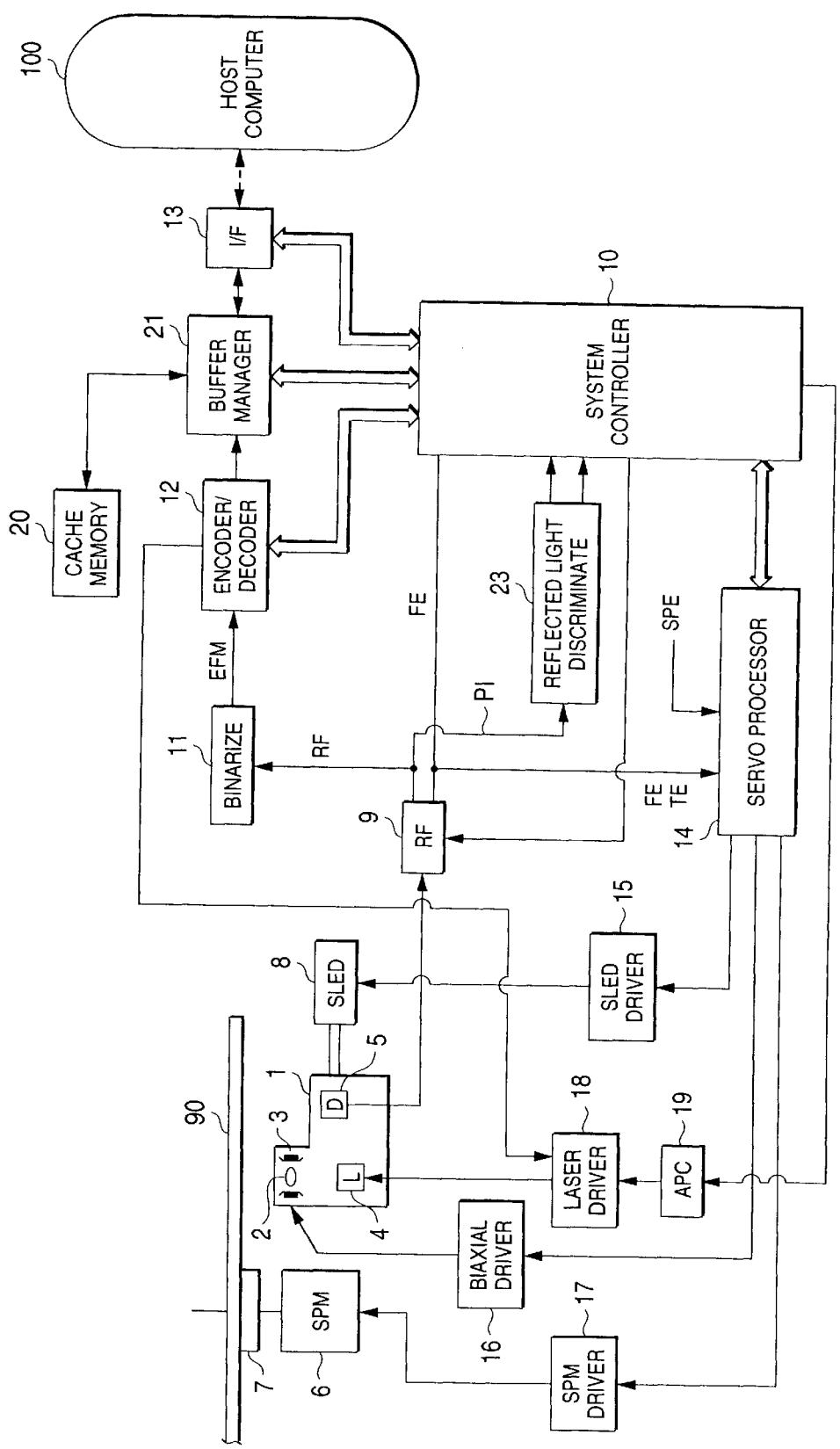
FIG. 1 is a block diagram showing the main part of a disk drive unit according to one embodiment of the invention.

FIG. 1 is a block diagram of the main part of the exemplary disk drive unit. This disk drive unit implements data recording/reproducing operation corresponding to a request from a connected host computer 100.

A disk 90 is a DVD type disk or a CD type disk such as CD-R and CD-ROM for example. The disk 90 is mounted on a turn table 7 and is rotated at constant line velocity (CLV) or constant angle velocity (CAV) by a pickup 1 in recording/reproducing data.

The pickup 1 reads data recorded in the disk 90 in emboss pit mode or phase change pit (mark) mode or records/erases data as phase change pits (mark).

Formed within the pickup 1 is a laser diode 4 which is a laser light source, a photo-detector 5 for detecting reflected light, an objective lens 2 which is an output end of the laser light and an optical system for irradiating the laser light to the disk recording plane via the objective lens 2 and for guiding the reflected light to the photo-detector 5.

The objective lens 2 is held movably in the tracking and focusing directions by a biaxial mechanism 3.

The whole pickup 1 is also held movably in the disk radial direction by a sledding mechanism 8.

The photo-detector 5 detects information of reflected light from the disk 90 which can be obtained by irradiating laser light in reproducing/recording data and supplies it to an RF amplifier 9 as an electrical signal corresponding to a quantity of received light.

The RF amplifier 9 comprises a current-voltage converting circuit, a matrix calculation/amplifier circuit and others in correspondence to output currents from a plurality of light receiving elements as the photo-detector 5 to generate required signals by a matrix calculating process. For instance, it generates an RF signal which is a reproduced data, a focus error signal FE for servo control, a tracking error signal TE or a pull-in signal PI which is a sum signal of reflected light.

The RF signal outputted from the RF amplifier 9 is supplied to a binarizing circuit 11 while the focus error signal FE and the tracking error signal TE are supplied to a servo processor 14.

A reflected light discriminating section 23 is arranged so as to be able to discriminate contaminant (dust, scratch, etc.) on the surface of the disk or defects of the recording plane based on speed of change of the level of the pull-in signal PI as described later in detail and supplies a discrimination signal to a system controller 10.

In the operation for reproducing data from the disk 90, the RF signal obtained by the RF amplifier 9 is transformed into a so-called EFM signal (8–14 modulation signal: in case of CD type disk) or an EFM+signal (8–16 modulation signal: in case of DVD type disk) by being binarized by the binarizing circuit 11 and is supplied to an encoder/decoder 12. The encoder/decoder 12 implements EFM demodulating and error correcting processes or CD-ROM decoding and MPEG decoding processes as necessary to reproduce the information read from the disk 90.

The data decoded by the encoder/decoder 12 is stored in a cache memory 20 by the operation of a buffer manager 21 for implementing processes of writing/reading to/from the cache memory 20. That is, a so-called buffering operation is carried out.

The data buffered in the cache memory 20 is transferred and outputted as the reproduced output from the reproducing unit.

It is noted that the data from the cache memory 20 is transferred and outputted under the control of the system controller 10 (control as firmware).

An interface section 13 is connected with the external host computer 100 to transmit reproduced data and to communicate read commands between the host computer 100.

That is, the reproduced data stored in the cache memory 20 is transferred and outputted to the host computer 100 via the interface section 13.

The read command and other signals from the host computer 100 are supplied to the system controller 10 via the interface section 13.

The servo processor 14 generates various servo drive signals of focusing, tracking, sled and spindle from the focus error signal FE and the tracking error signal TE from the RF amplifier 9 and a spindle error signal SPE from the encoder/decoder 12 or the system controller 10 to execute the servo operation.

That is, it generates the focus drive signal and the tracking drive signal in correspondence to the focus error signal FE and the tracking error signal TE to supply to a biaxial driver 16. The biaxial driver 16 drives focusing and tracking coils of the biaxial mechanism 3 in the pickup 1. Thereby, a tracking servo loop and a focus servo loop are formed by the pickup 1, the RF amplifier 9, the servo processor 14, the biaxial driver 16 and the biaxial mechanism 3.

It is noted that although the point where the focus error signal FE is zeroed and the point where information may be reproduced most efficiently from the disk 90 (that is, the point where the amplitude of the reproduced RF signal is maximized) must be the same ideally, actually those points deviate from each other. This deviation will be called as focusing bias and the servo system is controlled so that the focusing state is converged to the point where the amplitude of the reproduced RF signal is maximized by arranging it so as to add bias voltage corresponding to the focus bias to the focus error signal FE.

Tracking bias also exists in the tracking error signal TE.

The servo processor 14 also supplies a spindle drive signal generated corresponding to the spindle error signal SPE to a spindle motor driver 17. In corresponding to the spindle drive signal, the spindle motor driver 17 applies a three-phase drive signal for example to a spindle motor 6 to execute CLV rotation of the spindle motor 6. The servo processor 14 also generates the spindle drive signal corresponding to a spindle kick/brake control signal from the system controller 10 to cause the spindle motor driver 17 to execute the operations of the spindle motor 6 such as start and stop.

The servo processor 14 generates a sled error signal obtained as a low range component of the tracking error signal TE and a sled drive signal based on the control of execution of accesses and the like from the system controller 10 to supply to a sled driver 15. Corresponding to the sled drive signal, the sled driver 15 drives a sledding mechanism 8. Although not shown, the sledding mechanism 8 has a mechanism comprising a main shaft for holding the pickup 1, a sled motor, a transmission gear and the like. The pickup 1 is slidably moved as necessary as the sled driver 15 drives the sled motor 8 corresponding to the sled drive signal.

A laser driver 18 drives the laser diode 4 in the pickup 1 so as to irradiate laser light.

In executing the operation for recording/reproducing data to/from the disk 90, the system controller 10 sets values of control of the laser power in an automatic power control circuit (hereinafter referred to as an APC circuit) 19 and the APC circuit 19 controls the laser driver 18 so as to output laser corresponding to the values of the laser power.

During the operation for recording data to the disk 90, signals modulated corresponding to recording data are applied to the laser driver 18.

For instance, in recording data to the disk 90 of recordable type, recording data supplied from the host computer 100 to the interface section 13 is supplied to the laser driver 18 after undergoing the processes of addition of error correcting codes, EFM +modulation, NRZI modulation and others executed by the encoder/decoder 12.

Then, the recording of data to the disk 90 is executed when the laser driver 18 causes the laser diode 4 to irradiate laser light corresponding to the recording data.

The system controller 10 formed of a micro-computer controls the various operations such as servo, decoding and encoding as described above.

For instance, as a control of the series of reproducing operations, the system controller 10 issues a command to the servo processor 14 as an operation for reading a required data section corresponding to a read command from the host computer 100 and causes the pickup 1 to execute an accessing operation by targeting at the starting position of the data section required to transfer by the read command. Then, after ending the access, the system controller 10 causes the servo processor 14 to execute the reading of data, causes the encoder/decoder 12 and the cache memory 20 to execute required processes and controls so as to transfer the reproduced data (required data) from the interface section 13 to the host computer 100.

As a control of the recording operation, the system controller 10 issues a command to the servo processor 14 as an operation for writing supplied data corresponding to a write command from the host computer 100 to cause the pickup 1 to execute an operation for accessing to the writing start position. Then, after ending the access, the system controller 10 causes the cache memory 20, the encoder/decoder 12, the laser driver 18 and others to execute required processes to record the recording data (supplied data) to the disk 90.

Figure 2:
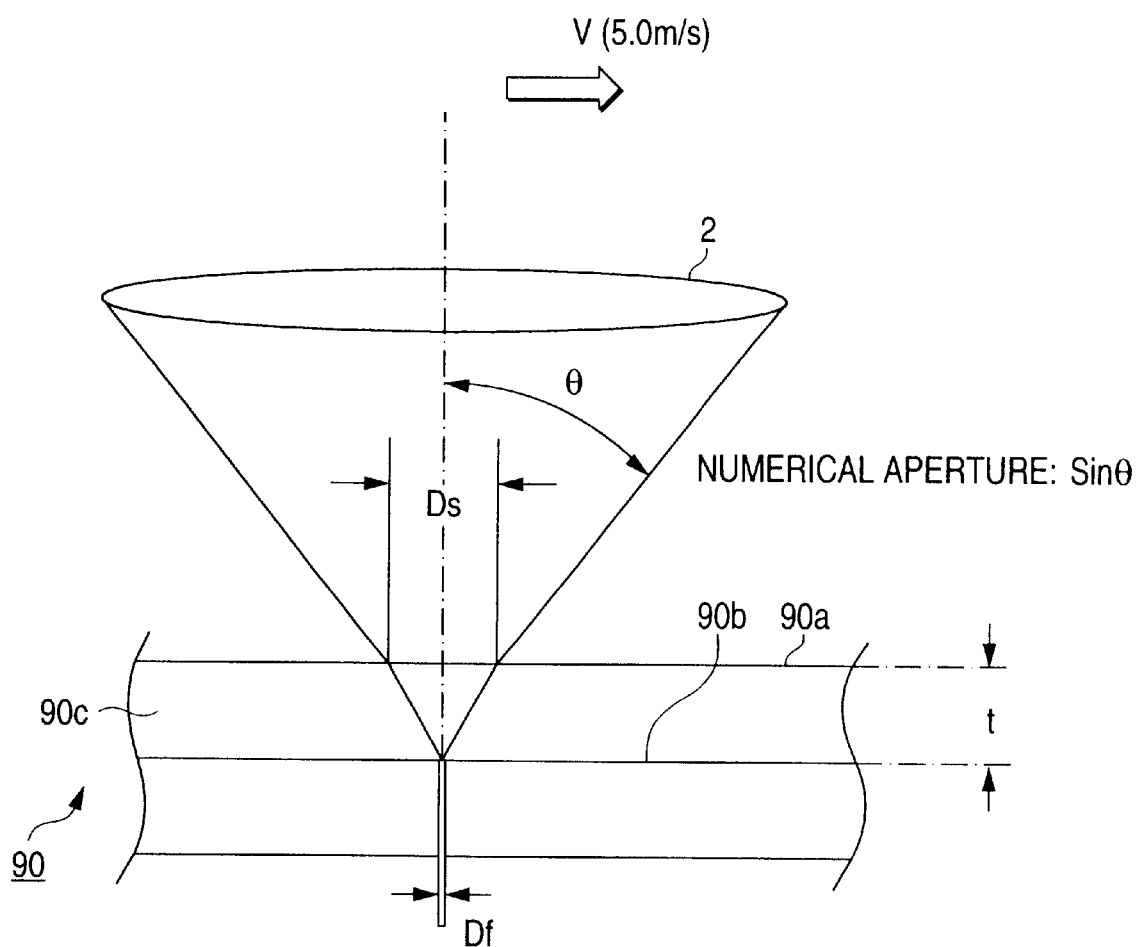
FIG. 2 is a diagrammatic view for explaining a beam outputted from an objective lens and a diameter of an illumination area of the beam on a disk.

FIG. 2 is a diagrammatic view for explaining the relationship of size of illumination area of a beam outputted from the objective lens 2 on the surface and the recording plane of the disk 90. It is noted that this figure is a plan view and the area where the beam is irradiated is illustrated by its diameter.

In the figure, an numerical aperture NA (sin θ) of the objective lens 2 is denoted as NAo, the refractive index of a disk substrate 90c as nl, a thickness from the surface 90a to the recording plane 90b of the disk as t and linear velocity when the disk 90 rotates as V. In this case, assuming that the beam outputted from the objective lens 2 is focused to the recording plane 90b, the diameter Ds of the illumination area of the beam at the surface 90a of the disk may be expressed as follows:

$$DS = \frac{2t\left(\frac{NAo}{nl}\right)}{\sqrt{1-\left(\frac{NAo}{nl}\right)\left(\frac{NAo}{nl}\right)}} \quad (1)$$

When the wavelength of the beam is λ, the diameter Df of the illumination area of the beam at the focal point on the recording plane 90b may be expressed as follows:

Df=1/NA

In case of DVD for example, NAo=0.6, nl=1.55, t=0.6 and λ=650 nm, so that Ds=0.50 mm and Df=1.08 μm.

Figure 3A:
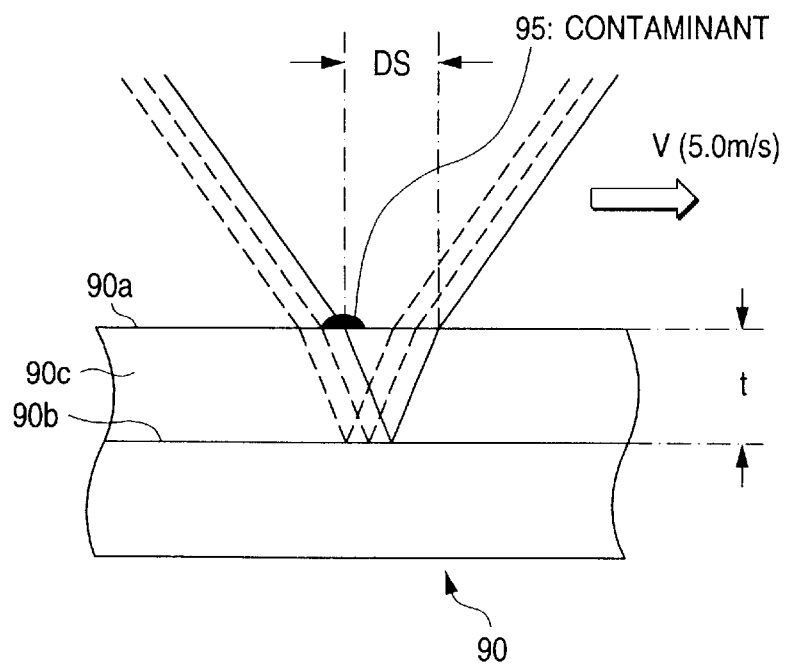
FIGS. 3A and 3B are diagrams for explaining dust on the surface of the disk and defect on the recording plane of the disk.

Here, assuming that a band-like contaminant 95 which is sufficiently large as compared to the diameter Ds of the beam irradiated to the disk surface 90a absorbs the beam almost completely as shown in a diagrammatic view of FIG. 3a, a time ts from when the beam is started to be blocked till when it is almost completely blocked may be expressed as follows:

ts=Ds/V

When V=5.0 m/s in this case, ts=100 μs.

Assuming also that a band-like defect 96 which is sufficiently large as compared to the diameter Df of the beam irradiated to the recording plane 90b absorbs the beam almost completely as shown in a diagrammatic view of FIG. 3b for example, a time tf from when the beam is started to be blocked till when it is almost completely blocked may be expressed as follows:

tf=Df/V

When V=5.0 m/s in this case, tf=216 ns.

Accordingly, the change of the quantity of reflected light appears in the level reduction time of the pull-in signal PI and may be expressed as:

ts>tf

That is, it is possible to discriminate the contaminant 95 on the disk surface 90a from the defect 96 of the recording plane 90b based on the time corresponding to the change of level of the pull-in signal PI.

Figure 3B:
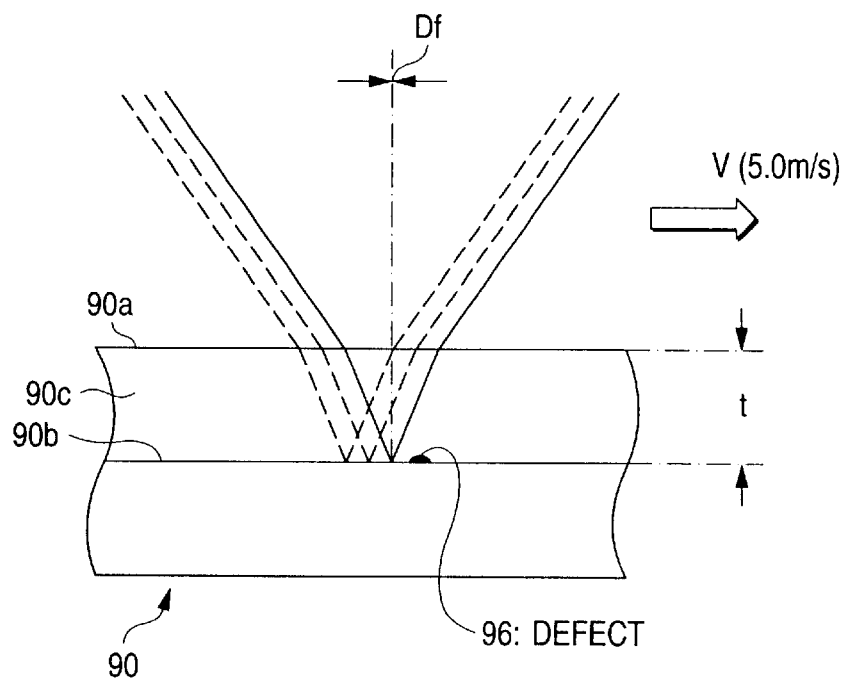

It is noted that the defect 96 shown in the recording plane 90b in FIG. 3b is diagrammatically shown to explain its position and size.

Figure 4:
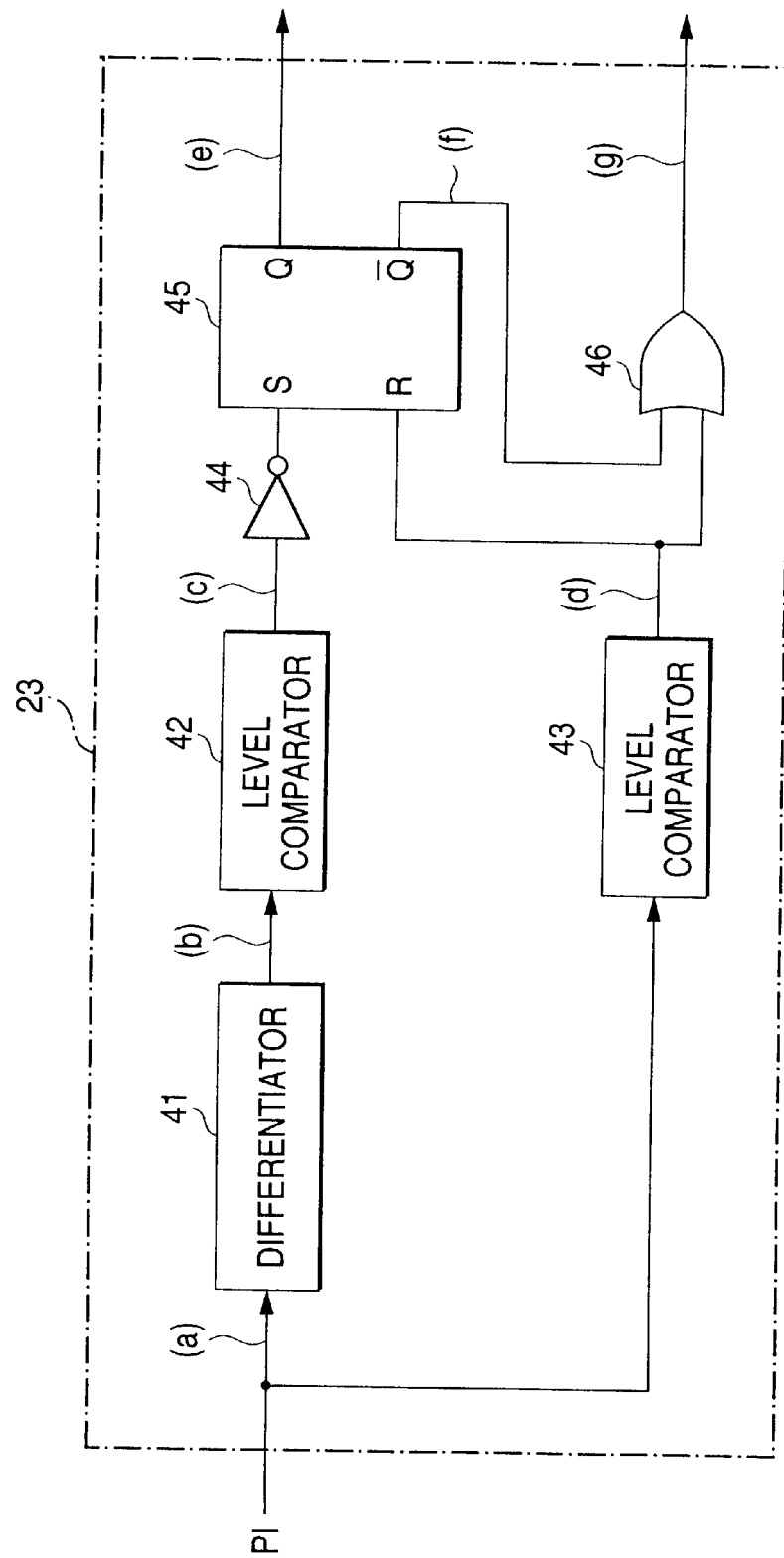
FIG. 4 is a diagram for explaining a structural example of a reflected light discriminating section.

FIG. 4 is a block diagram for explaining a structural example of the reflected light discriminating section 23 for discriminating the contaminant 95 from the defect 96 based on the pull-in signal PI outputted from the RF amplifier 9. It is noted that waveforms of signals at the regions denoted by (a) through (g) correspond respectively to signals in FIGS. 5A through 5G, respectively.

Figure 5:
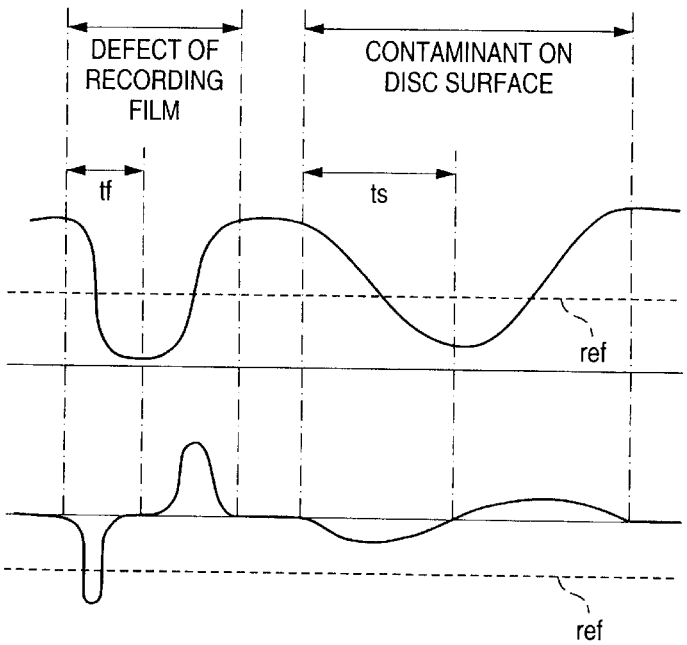
FIGS. 5A through 5G are charts showing signal waveforms at respective regions in the reflected light discriminating section.

The pull-in signal PI in FIG. 5A shows the condition influenced by the defect 96 and the contaminant 95 for example and its level is changed corresponding to the time ts or the time tf as described before. Such pull-in signal PI in FIG. 5A is supplied to a differentiator 41 having a certain time constant and then supplied to a level comparator 42 as a differential signal in FIG. 5B within the reflected light discriminating section 23. This differentiator 41 is formed by having the time constant almost at the intermediate point of the time tf and the time ts.

The level comparator 42 binarizes the differential signal in FIG. 5B by a certain reference value ref and outputs a binary signal in FIG. 5C. That is, because the time constant almost at the intermediate point of the time tf and the time ts is set in the differentiator 41, the binary signal in FIG. 5C is a signal corresponding to the level relatively quickly reducing.

A level comparator 43 binarizes the pull-in signal PI in FIG. 5A by a certain reference value ref and outputs a binary signal in FIG. 5D. This binary signal in FIG. 5D is an output corresponding to the change of level of the pull-in signal PI in FIG. 5A.

The binary signal in FIG. 5C from the level comparator 42 is inverted by an inverter 44 and then supplied to a set terminal of an RS flip-flop 45. The binary signal in FIG. 5D from the level comparator 43 is supplied to a reset terminal of the RS flip-flop 45 as well as to an OR gate 46. The RS flip-flop 45 outputs a defect detecting signal in FIG. 5E corresponding to the change of level caused by the defect of the recording plane 90b in the pull-in signal PI in FIG. 5A by setting by the binary signal in FIG. 5C and by resetting by the binary signal in FIG. 5D. That is, the output signal in FIG. 5E is an output signal which turns to low level for example corresponding to the change of level caused by the defect of the recording plane 90b in the pull-in signal PI in FIG. 5A.

The binary signal in FIG. 5D and an invertion signal in FIG. 5F of the RS flip-flop 45 are supplied to the OR gate 46 to output a logical sum of the respective signals. That is, the binary signal in FIG. 5D is masked by the inversion signal in FIG. 5F in the OR gate 46 to form a contaminant detecting signal in FIG. 5G. This contaminant detecting signal in FIG. 5G is an output signal which turns to low level corresponding to the change of level caused by the contaminant 95 on the disk surface 90a in the pull-in signal PI in FIG. 5A.

The reflected light discriminating section 23 generates the defect detecting signal in FIG. 5E and the contaminant detecting signal in FIG. 5G as described above and supplies to the system controller 10.

When the contaminant detecting signal in FIG. 5G is at low level for example, the system controller 10 controls the APC circuit 19 to increase a quantity of laser light outputted from the laser diode 4 to compensate the quantity of reflected light reduced due to the contaminant. It allows the quantity of light at the focal point on the recording plane 90b to be maintained at a predetermined level and the deterioration of the recording condition may be reduced.

When the defect detecting signal in FIG. 5E is at low level, the system controller 10 drives the biaxial mechanism 3 while holding the focus drive signal and the tracking drive signal by assuming that the defect 96 is detected on the recording plane 90b. It enables to suppress the focus servo and the tracking servo from deviating due to the defect. It is noted that it is possible to drive the pickup 1 while holding the sled error signal in some cases.

When the period of low level of the defect detecting signal in FIG. 5E continues for more than a predetermined time, the system controller 10 retries the recording operation.

Because the contaminant 95 and the defect 96 on the disk 90 may be discriminated based on the speed of the change of level of the pull-in signal PI as described above, the recording may be carried out continuously by increasing the quantity of laser light without retrying when the contaminant 95 is detected on the disk surface 90a. That is, it is possible to record stably while suppressing a number of times of retry even when data such as video image corresponding to real time is to be recorded to the disk 90 having much contaminant on the disk surface 90a.

A stable recording operation may be realized also when the defect is detected continuously for a certain degree of time because the recording operation is retried in such case.

It is noted that although the case of recording data has been exemplified in the description of the embodiment, the invention is also applicable in reproducing data. That is, when good reproduced signals cannot be obtained by being blocked by contaminant and the like, it is possible to maintain a quantity of laser light arriving at the recording plane by increasing a quantity of laser light from the laser diode 4.

By the way, the power of the laser light outputted from the laser diode 4 is controlled by the control values of the APC circuit 19 set by the system controller 10 for example. Then, it is possible to obtain the predetermined output of laser light under the control of the APC circuit 19 even when a quantity of reflected light from the disk 90 decreases due to contaminant or the like and the difference of quantity of laser light outputted from the laser diode 4 becomes large.

Figure 6:
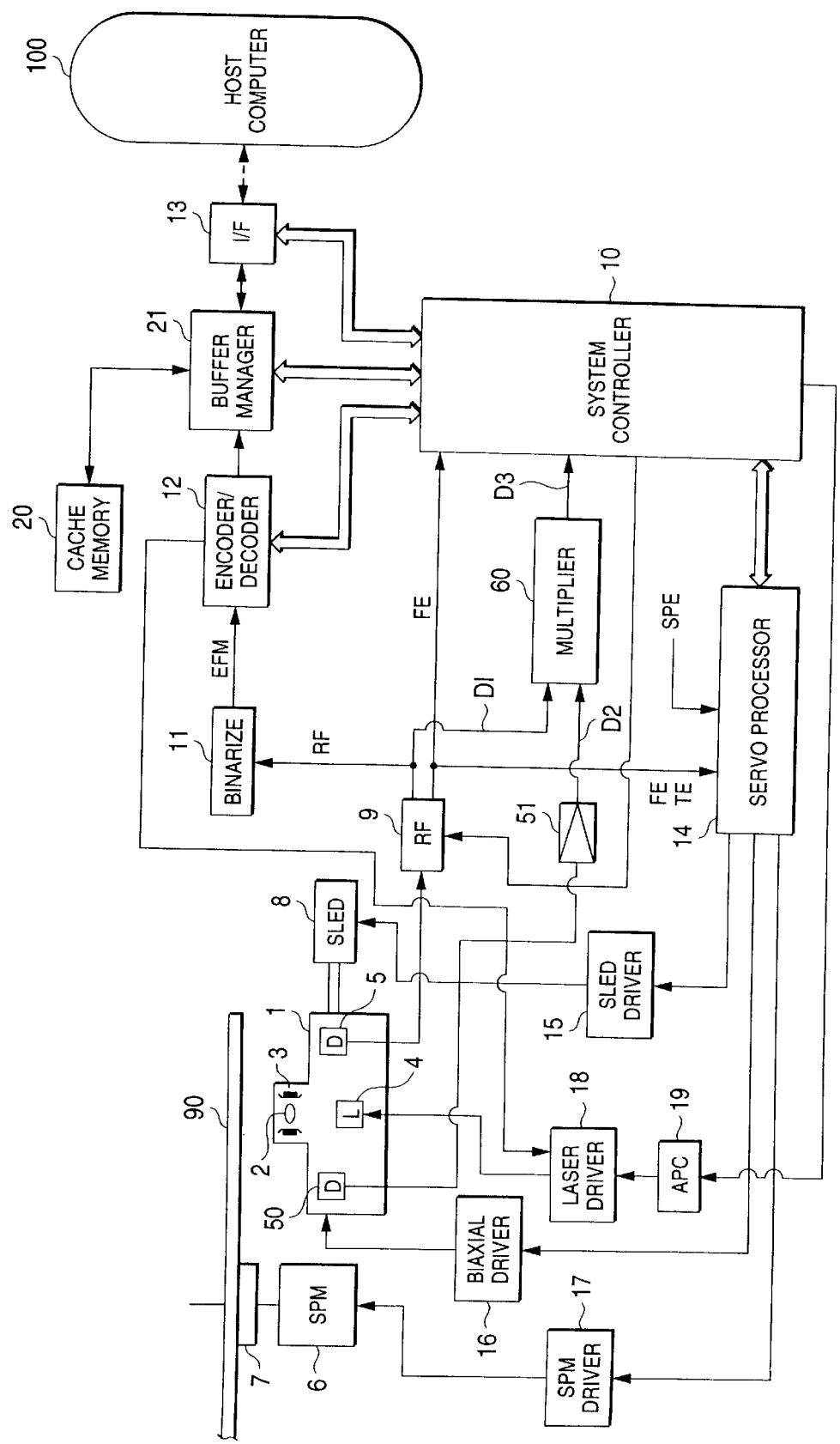
FIG. 6 is a block diagram showing the main part of a disk drive unit according to another embodiment of the invention.

In this case, a photo-detector 50 for detecting the quantity of laser light outputted from the laser diode 4 and an optical system for guiding the laser light (output light) outputted from the laser diode 4 with respect to the photo-detector 50 are formed within the pickup 1 as shown in FIG. 6 for example. Then, a product of signals detected by the photo-detector 5 for detecting the laser light from the disk 90 and by the photo-detector 50 for detecting the quantity of output light from the laser diode 4 is calculated to control the APC circuit 19 based on the product.

That is, a detection signal D1 detected by the photo-detector 5 and passed through the RF amplifier 9 and a detection signal D2 detected by the photo-detector 50 and passed through an amplifier 51 are supplied to an integrator section 60 and an integration signal D3 integrated by the integrator section 60 is supplied to the system controller 10 for example. While the system controller 10 sets the control value of the laser power at the APC circuit 19 as explained in FIG. 1, it sets a control value which allows a quantity of laser light to be obtained by which the integration signal D3 becomes a predetermined value here. Thereby, a control value which increases laser light is set at the APC circuit 19 when a quantity of reflected light from the disk 90 decreases due to contaminant for example. That is, the system controller 10 can maintain the quantity of laser light arriving at the recording plane 90a by executing the control of the APC circuit 19 based on the integration signal D3.

Thus, it becomes possible to control the laser light corresponding to contaminant or the like without changing the circuit considerably by controlling the APC circuit 19 based on the integration signal D3 of the detection signals D1 and D2. Accordingly, it is possible to realize the stable recording operation without carrying out retries even when contaminant exists on the surface of the disk 90 for example.

This example is also applicable in reproducing data. That is, it is possible to maintain a quantity of laser light arriving at the recording plane by increasing the quantity of laser light from the laser diode 4 when no good reproduced signal can be obtained as it is blocked by contaminant or the like.

While the preferred embodiments have been described, variations thereto will occur to those skilled in the art within the present inventive concepts which are delineated by the following claims.

What is claimed is:

1. A disk drive unit, comprising:
   head means for irradiating laser light to a loaded disk recording medium via an objective lens so as to at least record data;
   an objective lens driving mechanism for moving said objective lens in the direction of contacting/separating to/from said disk recording medium and in the radial direction of said disk recording medium based on certain control signals;
   reflected light quantity detecting means for detecting a quantity of reflected light of beam irradiated to said disk recording medium;
   light quantity reduction speed discriminating means for discriminating whether a detection of a quantity of reflected light comprises a reflected light time constant larger or smaller than a predetermined value time constant; and
   laser light output control means for controlling an output level of said laser light based on a discrimination result of said light quantity reduction speed discriminating means.

2. The disk drive unit according to claim 1, wherein said laser light output control means controls so as to increase the output level of said laser light when the reflected light time constant is larger than the predetermined time constant.

3. The disk drive unit according to claim 1, further comprising:

objective lens control means for holding servo signals for controlling the operation of said objective lens when the reflected light quantity detecting means detects the reduction of the quantity of reflected light.

4. The disk drive unit according to claim 3, further comprising:

recording control means for retrying recording operations when the reduction of the quantity of reflected light continues for more than a predetermined time.

5. A disk drive unit, comprising:

head means for irradiating laser light to a loaded disk recording medium via an objective lens so as to reproduce data previously recorded on said loaded disk recording medium;

output light quantity detecting means for detecting a quantity of output light of laser light outputted from said objective lens;

reflected light quantity detecting means for detecting a quantity of light reflected to said disk recording medium;

light quantity reduction speed discriminating means for discriminating whether a detection of a quantity of reflected light comprises a reflected light time constant larger or smaller than a predetermined value time constant; and output light quantity control means for controlling an output level of said quantity of output light so that a product of said quantity of output light and said quantity of reflected light equals a predetermined value.

6. A method for recording data on a disk drive unit, comprising:

irradiating laser light to a loaded disk recording medium via an objective lens so as to record data;

moving said objective lens in a direction of contacting/separating to/from said disk recording medium and in a radial direction of said disk recording medium based on predetermined control signals;

detecting a quantity of reflected light of beam irradiated to said disk recording medium;

discriminating whether a detection of a quantity of reflected light comprises a reflected light time constant larger or smaller than a predetermined value time constant; and controlling an output level of said laser light based on the discrimination result of said light quantity reduction speed discriminating means.

* * * * *